July 20, 1926.
J. W. MILLARD
1,593,130
VEHICLE BRAKE MECHANISM
Filed Jan. 1, 1924  2 Sheets-Sheet 1
FIG. I.
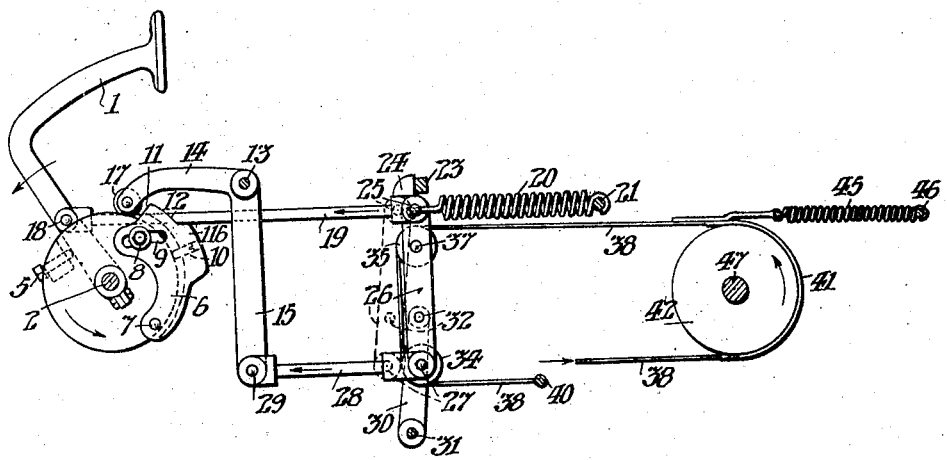
FIG. II.
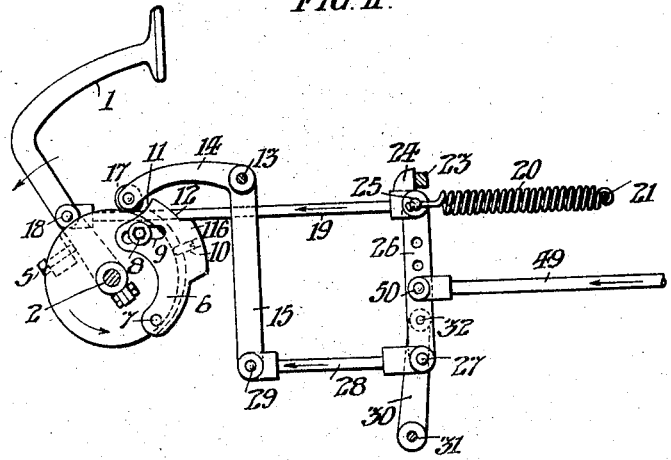
Inventor:
John Warren Millard,

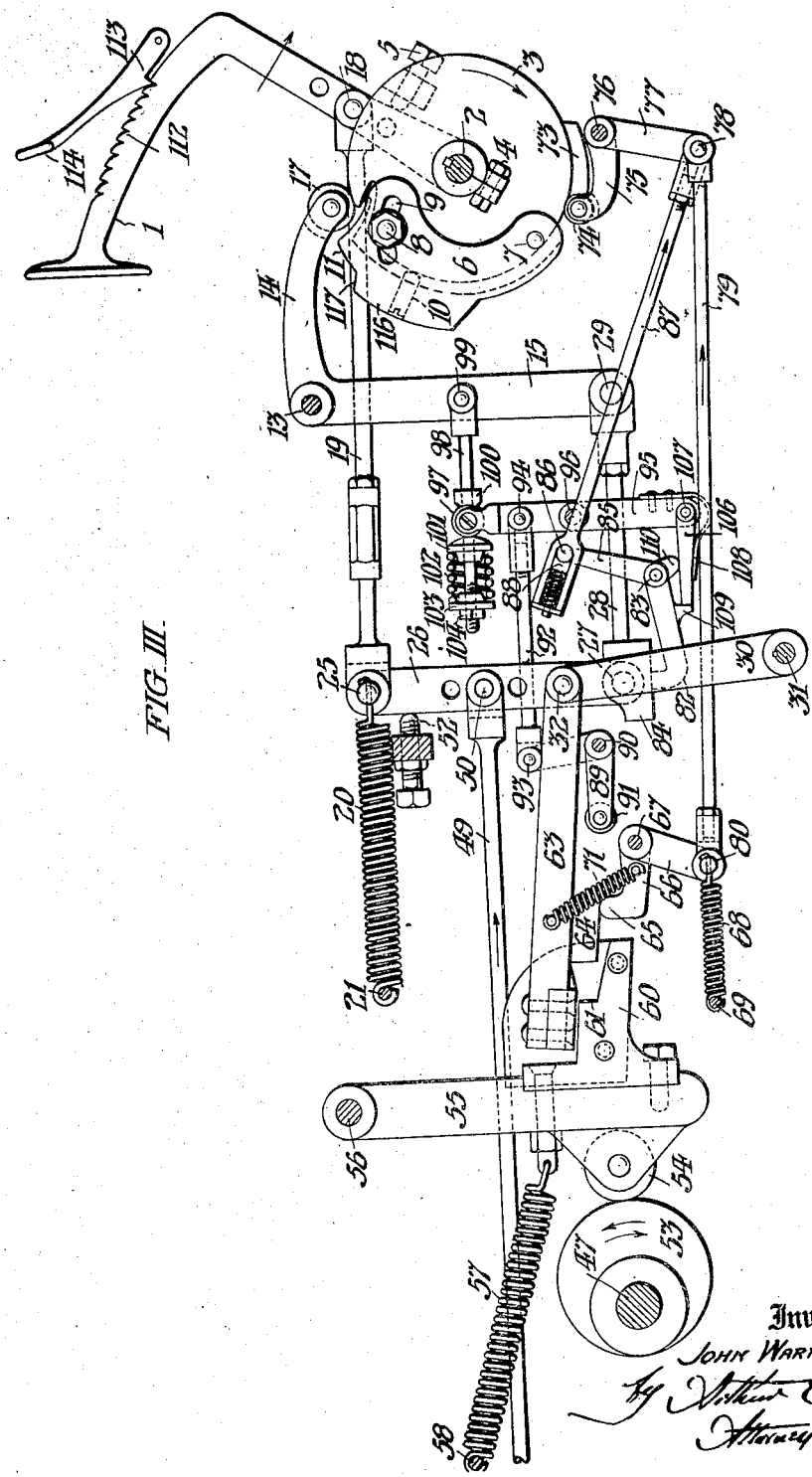

Patented July 20, 1926.

1,593,130

UNITED STATES PATENT OFFICE.

JOHN WARREN MILLARD, OF UPPER DARBY, PENNSYLVANIA.

VEHICLE BRAKE MECHANISM.

Application filed January 1, 1924. Serial No. 683,845.

My invention is particularly applicable to automobiles and, although designed and adapted for the application of brakes to all of the vehicle supporting wheels, it may be advantageously employed in conjunction with ordinary brake mechanism applicable only to the rear driving wheels.

Ordinarily, the prime mover in such vehicle brake mechanism is a pedal or hand lever so connected to the brakes that uniform movement of such lever causes uniform movement of the brakes. Consequently, it is characteristic of such devices of the prior art that a very large proportion of the movement of such operating levers is expended in taking up the slack in the brake mechanism before the brake is brought to the point where it begins to check the movement of the vehicle. As the range of movement of such operating levers is necessarily limited; such construction and arrangement impose the necessity of employing a low ratio between the movement of the operating lever and the movement of the brake, in order to thus take up the slack in the brake mechanism. Of course, little power is required to merely take up the slack in any brake mechanism, as compared with the power required to actually apply the brake or brakes to arrest the movement of the vehicle. Therefore, it is an object and effect of my invention to so connect a brake with the pedal or hand lever or other prime mover designed to operate the same that uniform movement of the prime mover does not effect uniform movement of the brake but, on the contrary, uniform movement of the prime mover causes an initial movement of the brake mechanism to take up the slack therein, to a greater extent in proportion to the movement of the prime mover, than the subsequent movement of the latter after the brake has reached the point where it begins to check the movement of the vehicle. In other words, the initial movement of the operating lever is effective upon the brake mechanism with less leverage than the subsequent movement of said lever; so that a greater range of movement of the prime mover is available for the actual braking action and, consequently, greater leverage is permitted for such action than is permissible in the ordinary brake mechanism aforesaid within a given range of movement of that portion of the prime mover to which power is applied by the foot or hand of the operator.

In addition to such differential movement of the manually operative element of the brake mechanism above contemplated; I find it desirable to utilize the movement of the vehicle, in either direction, to mechanically assist the operator in the operation of the brake mechanism and, as hereinafter described, such assistance may be available to not only take up the slack in the brake mechanism but to apply the brakes, or such assistance may be limited to the initial movement of the brake mechanism which is merely effective to take up the slack.

My invention includes the various novel features of construction and arrangement hereinafter more definitely specified.

In said drawings, Fig. I is a digrammatic elevation of essential elements of a form of my improved brake mechanism wherein the movement of the vehicle may be utilized in the application of the brake mechanism by frictional engagement of a rotary drum with a flexible connector leading to the brake mechanism.

Fig. II is a diagrammatic elevation, similar to Fig. I, but with the device for thus mechanically operating the brake mechanism omitted.

Fig. III is a digrammatic elevation of a more complex form of my invention wherein movement of the vehicle in either direction may be utilized to assist in the initial movement of the brake mechanism to the extent of taking up the slack.

Referring to the form of my invention shown in Fig. I; the prime mover 1 is indicated as a pedal lever which is rigidly connected with the fulcrum shaft 2. Said shaft 2 carries the cam disk 3 which is normally rigidly clamped thereon conveniently by the bolt 4 but which may be circumferentially adjusted, before it is thus clamped; such adjustment being effected by the set screw 5 which is carried by said disk 3 and impinges upon one side of said pedal lever 1. Said cam disk 3 carries the cam shoe 6 which is adapted to be adjusted radially with respect to the axis of said fulcrum shaft 2, by being pivoted at 7 to said cam disk and having the clamp bolt 8 extending through the slot 9 in said shoe, in engagement with said disk; the arrangement being such that when said bolt 8 is loosened, said cam shoe 6 may be swung on its pivot 7 to the desired position of adjustment, determined by rotation of the set screw 10, and then be rigidly connected with said disk by said bolt 8.

Said cam disk 3 is thus provided with an abrupt cam projection 11, on said shoe 6, which terminates at the substantially concentric surface 12, and is adapted to cooperate with the bell crank lever which is fulcrumed at 13 and comprises the arms 14 and 15; said arm 14 having the roller 17 which is encountered by said cam projection 11 when said pedal 1 is turned in the direction of the arrow shown thereon in Fig. I. Said operating pedal lever 1 is pivotally connected at 18 with the rod 19, which is operatively connected with the front end of the spring 20. Said spring has its rear end anchored at 21 and is effective to restore the mechanism to the normal position shown in Fig. I when released by the operator; such position being limited by the normally stationary stop member 23 which is encountered by the projection 24 on said rod 19. Said rod 19 is pivotally connected at 25 with the upper end of the yoke bar 26, which has its lower end pivotally connected at 27 with the link 28 which has its opposite end pivotally connected at 29 with the arm 15 of said bell crank lever. Said yoke bar 26 is upheld by the lever 30 fulcrumed at 31, to which it is pivoted at 32.

It is to be understood that the construction and arrangement above described are such that movement of said pedal lever 1, in the direction of the arrow marked thereon in Fig. I, not only pulls said yoke bar 26 directly forward by said rod 19, but, by the operation of said cam projection 11 upon the bell crank, comprising said arms 14 and 15, pulls the lower end of said yoke bar forward to a greater extent, as indicated by the dotted outline of said yoke bar 26 in Fig. I, which corresponds with the position of the mechanism when the crest of said cam projection 11 is presented beneath the roller 17 on said bell crank. Such compound movement of the yoke bar 26 is made effective to apply the brakes, by providing said yoke bar with the two sheaves 34 and 35 which are journaled on the respective shafts 27 and 37 carried by said yoke bar and engage the cable 38 the lower end of which is anchored at 40 to some stationary element of the vehicle and extends thence around said sheaves 34 and 35 and comprises the friction band 41 which extends around the drum 42; the free end of said cable being extended to the brake or brakes which are not illustrated but which are arranged to be operated by movement of said cable 38 in the direction of the arrow shown at the free end thereof. Said cable 38 is operatively connected with the spring 45 which is anchored at 46 and arranged to normally release said friction band 41 from engagement with said drum 42. Said drum 42 is rigidly connected with the shaft 47 which is turned in the direction of the arrow marked thereon by movement of the vehicle. It is to be understood that such movement of said drum 42 when the latter is frictionally engaged by said band 41, serves to mechanically assist in the movement of the brake cable 38 to apply the brakes. However, said friction band 41 is normally maintained in inoperative position by said spring 45 and is only brought into operation when the brake pedal 1 is manually operated as above contemplated.

The form of my invention shown in Fig. II is similar to that shown in Fig. I, except that the brake cable 38 and its appurtenances adapted to cooperate with the rotary drum 42, and the latter, are omitted, and the brake rod 49 is directly pivotally connected, at 50, to the yoke bar 26. Said brake rod 49 may be directly connected to any convenient form of brake or brakes.

Therefore, it may be observed that in the form of my invention shown in Fig. II; the operation of the brake mechanism is wholly manual; whereas, the operation of the brake mechanism shown in Fig. I is manually initiated and thereafter assisted by the movement of the vehicle to apply the brakes to arrest such movement. However, in the more complex form of my invention shown in Fig. III, movement of the vehicle in either direction may be utilized in taking up the slack in the brake mechanism, after the operation of the latter is manually initiated; but operation of that form of my invention may be wholly manual if and when the vehicle is not moving. For instance, if a vehicle provided with the mechanism shown in Fig. III is stationary and it is desired to set the brakes, the operation of the latter may be effected wholly manually by differential movement of the prime mover as above described; but, if the vehicle is moving in either direction when it is desired to apply the brakes, such movement may be utilized to assist in the braking operation.

In the form of my invention shown in Fig. III; the pedal lever 1 is rigidly connected with the fulcrum shaft 2 which carries the cam disk 3 which is adjustable thereon as above described and provided with the cam shoe 6 adjustable thereon as above described. Said operating lever 1 is pivotally connected at 18 with the rod 19 which is operatively connected with the front end of the spring 20. Said spring has its rear end anchored at 21 and is effective to restore the mechanism to the normal position shown in Fig. III when released by the operator; such position being limited by the normally stationary but adjustable stop screw 52 which is encountered by the yoke bar 26, which has its lower end pivotally connected at 27 with the link 28 which has its opposite end pivotally connected at 29 with said arm 15 of the bell crank lever. Said yoke bar 26 is upheld by the lever 30 fulcrumed at 31, to which it is pivoted at 32. The brake rod 49 is pivotally connected with said yoke bar 26 at 50 and the parts thus far described with reference to Fig. III operate in the manner above described with reference to Fig. II.

However, in the form of my invention shown in Fig. III, the shaft 47 is connected to turn with every movement of the vehicle; its direction of rotation corresponding with the direction of movement of the vehicle and, to utilize such movement to assist in the operation of the brake mechanism; I mount the cam 53 rigidly on said shaft 47, in opposition to the roller 54 which is journaled in the pendent follower lever 55 which is fulcrumed at 56 and connected to the front end of the spring 57, the rear end of which is anchored at 58; so that said lever 55 follows said cam 53 toward and away from said shaft 47 and is thus oscillated. Said follower lever 55 has the bracket 60 with the abutment 61 adapted to engage the left hand end of the latch lever 63 whenever the latter is lowered to the proper position for such engagement. Said latch lever 63 is fulcrumed at 32 in connection with said yoke bar 26 and its supporting lever 30 and has the lug 64 at its lower side in registry with the upturned end 65 of the bell crank lever 66 which is fulcrumed at 67 and provided with the spring 68 which is anchored at its rear end 69 and which normally tends to uphold said latch lever 63 in the position shown in Fig. III; said latch lever 63 being held down into cooperative relation with said lever 66 by the spring 71 which connects said levers.

In the position shown in Fig. III; said follower lever 55 is merely idly oscillated by rotation of the cam 53 in either direction. However, said latch lever 63 is arranged to be lowered into cooperative relation with said follower lever 55 so that rotation of said cam 53 is effective to thrust said yoke bar 26 to the right in Fig. III and thus assist in the movement of the brake rod 49, under control of said manually operative lever 1. Such control is effected by providing said cam disk 3 with the cam projection 73 adapted to encounter the roller 74 on the arm 75 of the bell crank lever which is fulcrumed at 76 and has its other arm 77 pivotally connected at 78 with the link 79 which is pivotally connected at 80 with said bell crank lever 66; so that movement of said operating lever 1 in the direction of the arrow marked thereon is effective to lower said latch lever 63 in position to be engaged by the abutment 61 carried by said follower lever 55. Thereupon, said follower lever 55 is swung to the position shown in Fig. III, but carries with it said latch lever 63, so as to thrust the yoke bar 26 to the right, with corresponding movement of the brake rod 49; thus mechanically assisting in the application of the brakes. Of course, continued rotation of the shaft 47 and cam 53 would permit the spring 57 to withdraw said follower lever 55 to the left and thus release the thrust upon said latch lever 63 and the tension upon the brake rod 49, unless some means be provided to hold said yoke bar 26 in the position to which it has been mechanically thrust as above described. Therefore, I provide the hook detent lever 82 which is fulcrumed at 83 and provided with means to snap it into engagement with the left hand corner of the detent block 84 which is rigidly connected with said link 28. In order to thus actuate said detent 82, it is provided with the crank arm 85 having the crank 86 extending in the slotted end of the connecting rod 87, which is pivotally connected to the bell crank lever arm 77 at 78 and carries the spring pressed slide 88 which is continually pressed against said crank 86. However, said crank 86 is prevented from moving under the pressure of said slide 88 until the cam disk 3 is rotated to depress the roller 74 by the cam 73. Such action shifts the connecting rod 87 in the direction of the arrow and not only frees the crank arm 85 to turn to the right, but compresses the spring which actuates said slide 88, to thrust said crank arm in that direction when it is permitted to move by the release of the detent hook 82, by movement of the detent block 84 to the right beyond the right hand edge of said hook.

In order to prevent the cam 53 from battering the abutment 61 against the left hand end of the latch lever 63, after the detent 82 is engaged as aforesaid; I provide the tripping lever 89 which is fulcrumed at 90 and carries the roller 91 in position to lift said latch lever when said tripping lever is turned clockwise. Such movement of said tripping lever is effected by the link 92 which is pivoted at 93 to said lever 89 and pivoted at 94 to the rock lever 95, which is fulcrumed at 96. The upper end of said rock lever 95 is bifurcated to hold between its opposite arms, the cylindrical bearing 97 through which extends the spring rod 98 which is pivoted at 99 on said bell crank lever arm 15 and has the stop collar 100 limiting the movement of said bearing 97 to the right. Said rod 98 carries the loose collar 101 which is pressed by the spring 102 against the left hand side of said bearing 97.

Said spring 102 is adjustably compressed by the washer 103 which is adjustable by rotation of the nut 104 on the screw threaded end of said rod 98. The construction and arrangement described are such that when said bell crank lever arm 15 is swung to the right by manual operation of said pedal 1 or by mechanical operation of said link 28; said rock lever 95 is freed to turn clockwise and pressed by said spring 102 in that direction. However, said rock lever is normally prevented from turning clockwise by the pawl 106 which is pivotally connected at 107 with its lower end and provided with the spring 108 which normally upholds it in engagement with the lug 109 on said detent 82. However, when said detent 82 is permitted to be snapped upward by the spring slide 88 above described, as a consequence of the movement of the link 28 and detent block 84 to the right by the operation of said cam 53; the pawl releasing cam 110 on said detent lever 82 knocks said pawl 106 downward, against the pressure of its spring 108, and thus releases said rock lever 95 so that it is permitted to turn clockwise under pressure of said spring 102, which has been set as aforesaid, and with the effect of uplifting said latch lever 63 by clockwise movement of said tripping lever 89. Such movement of the tripping lever 89 restores said latch lever 63 to the position shown in Fig. III, where it is, however, shown as being upheld by the bell crank lever 66 which has been initially lowered by the operation of the cam 73 on the cam disk 3, by the pedal lever 1.

The brakes connected with the rod 49 shown in Fig. III having been thus applied; they may be held in operation by continued pressure upon the pedal 1, against the tension of the spring 20. However, upon releasing such pressure, said pedal 1 is restored to the position shown in Fig. III, by said spring 20, thus automatically effecting restoration of all of the parts to the initial position shown in said figure; wherein the follower lever 55 is free to oscillate, idly, with each rotation of the cam 53 which, as above noted, is continuously turned by the shaft 47 during movement of the vehicle in either direction.

Although the brake mechanism shown in Fig. III is thus adapted to be operated by said mechanically actuated cam 53, during any movement of the vehicle, whenever the clockwise movement of said pedal 1 is manually initiated to the extent necessary to operate, by the cam 73, the bell crank lever provided with the roller 74; it is to be understood that said mechanism is at all times susceptible of being manually operated to apply the brakes without such mechanical assistance; so that the brakes may be applied when the vehicle is stationary. Of course, means may be provided to hold the brake mechanism with the brakes applied, without continued pressure upon said pedal 1 by the operator. For instance, said lever 1 may be provided with a series of ratchet teeth 112 adapted to be automatically engaged by the pawl 113 which may be released by the lever 114.

As above contemplated; the brake mechanism shown in Fig. III may be operated as follows: The mechanism being in the normal position shown in said figure, in which the follower lever 55 is free to swing back and forth under the tension of the spring 57 and thrust of the cam 53 which is turned by the movement of the vehicle in either direction; the operator thrusts said lever 1 clockwise, against the tension of the spring 20, to initiate the operation of the brakes. The first effect of such movement is to press the roller 74 downward and hold it down by the clockwise movement of the cam 73 over it. Such action turns the bell crank lever 66 counter-clockwise, against the tension of its spring 68, thus causing the latch lever to be lowered, by its spring 71, into position to be thrust to the right by the mechanical movement of the follower lever 55, if the shaft 47 and its cam 53 are being turned in either direction, by the movement of the vehicle. Such operation of the cam 73, by the pedal 1, also, simultaneously, withdraws the connecting rod 87 to the right, thus releasing the detent lever 82 for subsequent movement and compressing the spring of the slide 88 to effect such movement, if and when the bell crank lever arm 15 is turned counter-clockwise. Such movement of said arm 15 may be effected manually by the cam 11 lifting the roller 17 to the crest of said cam during the continued clockwise movement of said pedal 1; or such movement of said lever arm 15 may be effected mechanically by the thrust of said cam 53 upon the follower lever 55 transmitted by the abutment 61 of the latter through the latch lever 63 and yoke bar 26 and the link 28 to said arm 15. In either case; i. e., either by wholly manual operation of said pedal 1 or by such operation supplemented by the mechanical operation of said cam 53; said arm 15 is turned counter-clockwise until the detent 82 is free to snap up beyond the left hand end of the detent block 84 carried by said link 28 at the lower end of said yoke bar 26 and thus hold said yoke bar against return movement to the left until released from said detent 82. Such counter-clockwise movement of said bell crank lever arm 15 draws the spring rod 98 to the right thus allowing room for the rock lever 95 to turn clockwise, and compressing the spring 102, to effect such movement when the pawl 106 is released. The above described engaging movement of the detent 82 effects the release of said pawl 106 by the releasing cam 110, carried by said detent lever 82, and thus permits said spring 102 to operate to turn the rock lever 95 clockwise and trip the latch lever 63 upward to the position shown in Fig. III, by clockwise movement of the tripping lever 89, thereafter permitting said follower lever 55 to be oscillated idly by the cam 53 if the vehicle continues to move, with the brakes applied to that extent. For instance, if the brakes are thus used to merely retard the movement of the vehicle without arresting such movement.

It may be observed that when the mechanism has reached that stage; the back pressure, counter-clockwise, of said pedal 1 is partially relieved by the cams 11 and 73 supporting said rollers 17 and 74 upon the portions of said cams which are substantially concentric with the axis of the shaft 2. However, it may be observed that the cam shoe 6 has a portion 116 of greater radial extent which may be brought into operation by further clockwise movement of the pedal so as to arrest the movement of the vehicle by setting the brakes in that extreme position. It may be observed that the incline 117 leading to the crest 116 of said cam is less abrupt than the cam 11 so that a greater leverage is thus afforded to the operator of said pedal 1. As above contemplated; said brake mechanism may be manually held with the brakes thus applied, or may be mechanically held, by the engagement of the pawl 113, or any other suitable means. When it is desired to release the brakes; said pedal lever 1 is permitted to turn counter-clockwise, under the tension of the spring 20, with the effect of restoring the parts to the position shown in Fig. III.

As above noted, in each of the three forms of my invention chosen for illustration, a differential movement of the brakes, with successively increasing power multiplication, may be effected by uniform movement of the prime mover, and such movement may be effected wholly manually, by power applied to said prime mover, or may be thus initiated manually and be supplemented or continued by power from an auxiliary mover, exemplified by said drum 42 and cam 53, automatically operated, mechanically, as a consequence of the movement of the vehicle, and such mechanical assistance may be utilized to merely take up the slack in the brake mechanism or to apply the brakes to the maximum extent. Therefore, I do not desire to limit myself to the precise details of construction and arrangement herein set forth, as it is obvious that various modifications may be made therein without departing from the essential features of my invention, as defined in the appended claims.

I claim:

1. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle, which is opposed by said brake, and means operatively connecting said rotary member with said brake, including said yoke bar, and a latch lever; means connecting said cam disk with said latch lever, arranged to successively render said latch lever operative and inoperative, during the progressive movement of said prime mover; means arranged to temporarily detain said mechanism in a position to which it may be advanced by said rotary element, including a detent lever arranged to cooperate with said yoke bar; a tripping device, arranged to release said detent; and spring means arranged to reverse the operative movement of said prime mover, and automatically restore said mechanism to its initial idle position.

2. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake, including said yoke bar; means arranged to successively render said rotary element operative and inoperative, upon the brake mechanism, during the progressive movement of said prime mover; means arranged to temporarily detain said mechanism in a position to which it may be advanced by said rotary element, including a detent lever arranged to cooperate with said yoke bar; a tripping device, arranged to release said detent; and spring means arranged to reverse the operative movement of said prime mover, and automatically restore said mechanism to its initial idle position.

3. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake, including said yoke bar; means arranged to successively render said rotary element operative and inoperative, upon the brake mechanism, during the progressive movement of said prime mover; and spring means arranged to reverse the operative movement of said prime mover, and automatically restore said mechanism to its initial idle position.

4. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake, including said yoke bar; means arranged to temporarily detain said mechanism in a position in which it may be advanced by said rotary element, including a detent; a tripping device, arranged to release said detent; and spring means arranged to reverse the operative movement of said prime mover, and automatically restore said mechanism to its initial idle position.

5. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake, including said yoke bar; and spring means arranged to reverse the operative movement of said prime mover, and automatically restore said mechanism to its initial idle position.

6. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake, including said yoke bar; means arranged to be operated by said cam disk, to successively render said rotary element operative and inoperative, upon the brake mechanism, during the progressive movement of said prime mover; means arranged to temporarily detain said mechanism in a position to which it may be advanced, including a detent arranged to cooperate with said yoke bar; a tripping device, arranged to release said detent; and spring means arranged to reverse the operative movement of said prime mover, and automatically restore said mechanism to its initial idle position.

7. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake; means arranged to be operated by said cam disk, to successively render said rotary element operative and inoperative, upon the brake mechanism, during the progressive movement of said prime mover; and spring means arranged to reverse the operative movement of said prime mover, and automatically restore said mechanism to its initial idle position.

8. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to mechanically assist in the operation of said brake mechanism, including a rotary element, arranged to be turned by the movement of the vehicle which is opposed by said brake, and means operatively connecting said rotary element with said brake; and spring means arranged to reverse the operative movement of said prime mover, and automatically restore said mechanism to its initial idle position.

9. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; means arranged to temporarily detain said mechanism in a position to which it may be advanced, including a detent; a tripping device, arranged to release said detent; and spring means arranged to reverse the operative movement of said prime mover, and automatically restore said mechanism to its initial idle position.

10. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; such initial movement being effective to take up the slack in the mechanism, with low power leverage, and the subsequent movement being effective to apply said brake at higher power leverage; and spring means arranged to reverse the operative movement of said prime mover, and automatically restore said mechanism to its initial idle position.

11. In vehicle brake mechanism, the combination with a manually operative prime mover, including a lever; of a cam disk carried by said lever; means arranged to connect said lever with a brake, including a yoke bar; means arranged to connect said cam disk with said brake, including said yoke bar; whereby uniform movement of said prime mover effects differential movement of said brake, the initial movement being relatively greater than the subsequent movement; and spring means arranged to reverse the operative movement of said prime mover, and automatically restore said mechanism to its initial idle position.

12. In vehicle brake mechanism, the combination with a manually operative prime mover; of a cam carried by said mover; means arranged to connect said mover with a brake, including a yoke bar; means arranged to connect said cam with said brake, including said yoke bar; whereby uniform movement of said prime mover effects differential movement of said brake, the initial movement being relatively greater than the subsequent movement; and spring means arranged to reverse the operative movement of said prime mover, and automatically restore said mechanism to its initial idle position.

13. In vehicle brake mechanism, the combination with a manually operative prime mover; of a cam carried by said mover; means arranged to connect said mover with a brake; means arranged to connect said cam with said brake; whereby uniform movement of said prime mover effects differential movement of said brake, the initial movement being relatively greater than the subsequent movement; and spring means arranged to reverse the operative movement of said prime mover, and automatically restore said mechanism to its initial idle position.

14. In vehicle brake mechanism, the combination with a manually operative prime mover; of means arranged to connect said mover with a brake; whereby uniform movement of said prime mover effects differential movement of said brake, the initial movement being relatively greater than the subsequent movement; such initial movement being effective to take up the slack in the mechanism, with low power leverage, and the subsequent movement being effective to apply the same brake at higher power leverage; and spring means arranged to reverse the operative movement of said prime mover, and automatically restore said mechanism to its initial idle position.

15. In vehicle brake mechanism, the combination with a manually operative prime mover; of means arranged to connect said mover with a brake, including a yoke bar, arranged to cooperate with said prime mover as a compound lever; whereby uniform movement of said prime mover effects differential movement of said yoke bar, the initial movement being relatively greater and with less multiplication of power than the subsequent movement; and spring means arranged to reverse the operative movement of said prime mover, and automatically restore said mechanism to its initial idle position.

16. In vehicle brake mechanism, the combination with a manually operative prime mover; of means arranged to connect said mover with a brake, including a yoke bar, arranged to cooperate with said prime mover as a compound lever; whereby uniform movement of said prime mover effects differential movement of said yoke bar, the initial movement being relatively greater and with less multiplication of power than the subsequent movement.

In testimony whereof, I have hereunto signed my name at Philadelphia, Pennsylvania, this twentieth day of December, 1923.

JOHN WARREN MILLARD.